(12) United States Patent
Hansen

(10) Patent No.: US 11,929,580 B2
(45) Date of Patent: Mar. 12, 2024

(54) ELECTRICAL POWER STRIP

(71) Applicant: Raymond Innovations, LLC, Black Hawk, SD (US)

(72) Inventor: Will Hansen, Rapid City, SD (US)

(73) Assignee: RAYMOND INNOVATIONS, LLC, Black Hawk, SD (US)

(*) Notice: Subject to any disclaimer, the term of this patent is extended or adjusted under 35 U.S.C. 154(b) by 393 days.

(21) Appl. No.: 17/233,962

(22) Filed: Apr. 19, 2021

(65) Prior Publication Data

US 2021/0328390 A1 Oct. 21, 2021

Related U.S. Application Data

(60) Provisional application No. 63/011,442, filed on Apr. 17, 2020.

(51) Int. Cl.
*H01R 13/713* (2006.01)
*H01R 13/66* (2006.01)
*H01R 13/73* (2006.01)
*H02H 7/22* (2006.01)
*H02H 9/00* (2006.01)
*H02H 9/02* (2006.01)
*H01R 25/00* (2006.01)
*H01R 27/02* (2006.01)

(52) U.S. Cl.
CPC ....... *H01R 13/713* (2013.01); *H01R 13/6683* (2013.01); *H01R 13/73* (2013.01); *H02H 7/228* (2013.01); *H02H 9/002* (2013.01); *H02H 9/02* (2013.01); *H01R 25/006* (2013.01); *H01R 27/02* (2013.01)

(58) Field of Classification Search
CPC ... H01R 13/6683; H01R 13/713; H02H 9/001
See application file for complete search history.

(56) References Cited

U.S. PATENT DOCUMENTS

| | | | |
|---|---|---|---|
| 7,964,994 B2 | 6/2011 | DuBose et al. | |
| 9,088,117 B2* | 7/2015 | Rosenblum | H01R 25/006 |
| 9,985,396 B1* | 5/2018 | Ho | H01R 43/18 |
| 10,250,032 B2* | 4/2019 | Ferguson | H02J 3/00 |
| 2010/0314949 A1* | 12/2010 | DuBose | H02J 9/005 |
| | | | 307/131 |
| 2021/0005989 A1* | 1/2021 | Byrne | H01H 83/00 |

* cited by examiner

*Primary Examiner* — Jared Fureman
*Assistant Examiner* — Christopher J Clark
(74) *Attorney, Agent, or Firm* — Goodhue, Coleman & Owens, P.C.

(57) ABSTRACT

A power strip and method for providing and controlling power to power strip outlets and for differing amperages and/or voltages is disclosed. The power strip includes a power cord for connecting to a power outlet and a plurality of electrical outlets of the same of differing amperage and voltage connected to receive the electrical current from the power cord. At least one of the plurality of electrical outlets is powered continuously with electrical current from the power outlet. Electrical current from the power outlet to the plurality of electrical outlets is controlled by load presence controlled circuit, current limiting circuit, and/or soft-start circuitry.

7 Claims, 15 Drawing Sheets

ELECTRICAL POWER STRIP

CROSS REFERENCE TO RELATED APPLICATIONS

This application claims priority under 35 U.S.C. § 119 to provisional application Ser. No. 63/011,442 filed on Apr. 17, 2020, which is incorporated by reference in its entirety.

FIELD OF THE INVENTION

The present disclosure relates to power strips. Particularly, the present disclosure relates to a power strip configured for providing and controlling electrical current to one or more power strip outlets, such as outlets of the same or different voltage and/or amperage. More particularly, but not exclusively, the present disclosure relates to a controlled power strip with the same or different voltage and/or amperage outlets and load presence controls for a power strip having one or more electrical outlets configured for controlling electrical current to one or more electrical devices plugged into the power strip.

BACKGROUND

Power strips continue to evolve to meet the ever-growing demand for supplying electricity from a single outlet to multiple outlets for providing electricity to a multitude of power consuming devices. Some power strips are configured with surge protectors, that when tripped cut power to all the outlets of the power strip. Other power strips, referred to as "smart" power strips, have some outlets that are on all the time while other outlets turn off stand-by power to peripheral devices, such as phantom devices, that draw power continually even when not used. Although power strips have surge protection against current surges/spikes and stand-by power protection against phantom electrical devices, current power strips are unable to manage current and control which outlets are on, off or soft started depending on current demand from the electrical devices plugged into the power strip and the current restrictions for the outlet in which the power strip is plugged into. Further, these and other outlets are unable to provide power controls to power strip outlets of varying voltage and/or amperage.

Often power strips are laid on a surface within a work or other environment, such as on a floor or table, and as a result, a multitude of unnecessary hazards are created and presented within the work or other environment, whether from the power strip itself, from the cords plugged into and extending from the power strip, or the devices plugged into the power strip. The unnecessary hazards, include but are not limited to, the potential of electrocution, fire, and damage to the power strip, outlets, extension cords, and devices plugged into the power strip. Therefore, what is needed is a power strip, power strip kit, or power strip mounting/standing hardware that allow the position and attitude of the power strip to be controlled relative to the work or other environment to limit risk and unnecessary hazards presented from power strip use.

SUMMARY

Therefore, there exists a need in the art to overcome the deficiencies and limitations for providing and/or controlling current to outlets of the same or different voltage of a power strip.

In view of the foregoing, it is a primary object, feature, or advantage of the present disclosure to improve over the state of the art.

It is a further object, feature, or advantage of the present disclosure to provide a load presence controlled power strip that is configured to turn on and off one or more of its electrical outlets.

It is yet an object, feature, or advantage of the present disclosure to provide a single power strip with the same or different voltage outlets and corresponding circuitry for controlling power to the same or different voltage and/or amperage outlets.

It is still a further object, feature, or advantage of the present disclosure to provide a power strip that is configured to manage electrical current to one or more of its outlets, including outlets having the same voltage and/or amperage or outlets having different voltage and/or amperage.

It is another object, feature, or advantage of the present disclosure to provide a power strip that is configured to manage current to one or more electrical devices plugged into one or more of its outlets.

It is a still another object, feature, or advantage of the present disclosure to provide a power strip configured with circuitry for controlling power to one or more outlets of the same or different voltage and/or amperage and one or more cooling elements for dissipating heat.

It is yet another object, feature, or advantage of the present disclosure to provide a power strip that is configured to manage current flow to one or more of its outlets based on current and voltage provided to the power strip from an electrical outlet supplying electricity to the power strip.

It is still another object, feature, or advantage of the present disclosure to provide a power strip that is configured to manage current flow to one, multiple or each of its outlets to prevent tripping the breaker of the electrical outlet feeding electricity to the power strip.

It is yet another object, feature, or advantage of the present disclosure to provide a power strip with outlets of the same or different voltage and/or amperage and circuit controls for controlling power to the same or different voltage outlets.

It is yet another object, features, or advantage of the present disclosure to provide a load presence controlled power strip that has one or more soft start outlets.

According to at least one object of the present disclosure, a circuit controlled power strip with different voltage and/or amperage outlets is disclosed. The controlled power strip includes, for example, components, such as, a portable housing having a single electrical input electrically connected to a plurality of electrical outlets, wherein the controlled power strip includes one or more power control circuits and is configured for taking power from the single electrical input and distributing power to the plurality of electrical outlets disposed on the portable housing. The plurality of electrical outlets can include one or more electrical outlets of differing amperage. The plurality of electrical outlets can include one or more electrical outlets of differing voltage. The one or more control circuits can include one or more circuit protection circuits for controlling power to the one or more electrical outlets.

According to at least on object of the present disclosure, a load presence controlled power strip is disclosed. The load presence controlled power strip includes, for example, a power cord for connecting to a power outlet and providing an electrical current for powering the power strip, a plurality of electrical outlets connected to receive the electrical current from the power cord, a current limiting circuit connected between the power cord and the plurality of electrical outlets, a microcontroller connected for controlling the current limiting circuit, a current sensor connected to the plurality of electrical outlets, one or more current limiting components within the current limiting circuit for increasing voltage and current from the power outlet to the plurality of electrical outlets by operation of the current sensor and the microcontroller.

According to another object of the present disclosure, a method for controlling power to outlets of a load presence controlled power strip is disclosed. The method can include, by way of example, one or more steps, such as, providing a power strip with a power cord for connecting to a power outlet and a plurality of electrical outlets connected to receive the electrical current from the power cord, powering the power strip with an electrical current from the power outlet, configuring a current limiting circuit connected between the power cord and the plurality of electrical outlets, controlling a microcontroller connected to the current limiting circuit, detecting current draw with a current sensor connected to at least one of the plurality of electrical outlets, and increasing current over time to one of the plurality of electrical outlets by the configuring of the current limiting component by operation of the microcontroller if the current sensor detects electrical current to the one of the plurality of electrical outlets.

According to at least one other object of the present disclosure, a method for controlling power to power strip outlets may have one or more of the following steps: providing a power strip with a power cord for connecting to a power outlet and a plurality of electrical outlets connected to receive the electrical current from the power cord; continuously powering at least one of the plurality of electrical outlets with electrical current from the power outlet; controlling an electrical current from the power outlet to the plurality of electrical outlets with a current limiting circuit; and powering on one of the plurality of electrical outlets when in use and powering off remaining ones of the plurality of electrical outlets when the one of the plurality of electrical outlets is in use by operation of the current limiting circuit. In one aspect, the current limiting circuit controls current ramp up over a period of time to one or more of the outlets.

A load presence controlled power strip according to aspects of the present disclosure may have one or more of the following features: (a) a single electrical input (i.e., power cord), (b) a plurality of electrical outlets, (c) a microcontroller operably coupled to the zero-crossing detector, (d) a Triac/scr circuit operably coupled to the microcontroller and one, multiple or each the electrical outlets, (e) a current sensor operably coupled to the electrical inlet, (f) a power strip housing enclosure housing the microcontroller, the Triac/scr circuit and the plurality of electrical outlets, and (g) a zero-crossing detector operably coupled to the current sensor.

A load presence controlled power strip according to aspects of the present disclosure may have one or more of the following features: (a) a power strip housing enclosure, (b) a single electrical input (i.e., power cord), (c) a plurality of electrical outlets located on the power strip housing enclosure, (d) at least one thermistor is in series with the electrical input and electrical output, (e) a temperature sensor coupled to the at least one thermistor and an axial cooling fan, (f) at least one thermistor, where the temperature sensor detects a temperature of the at least one thermistor, (g) the axial fan electrically is powered on to cool the at least one thermistor when the temperature sensor detects the at least one thermistor is above a pre-determined temperature, (h) a bypass circuit electrically coupled to an electrical input and the at least one thermistor, (i) a microcontroller electrically coupled to the bypass circuit, (j) a current sensor electrically coupled with the microcontroller and the at least one thermistor, (k) a PCB board supporting the at least one thermistor and the temperature sensor, and (l) at least one exhaust port in the power strip housing enclosure.

One or more of these and/or other objects, features, or advantages of the present disclosure will become apparent from the specification and claims that follow. No single aspect need provide every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein.

Figure 1:
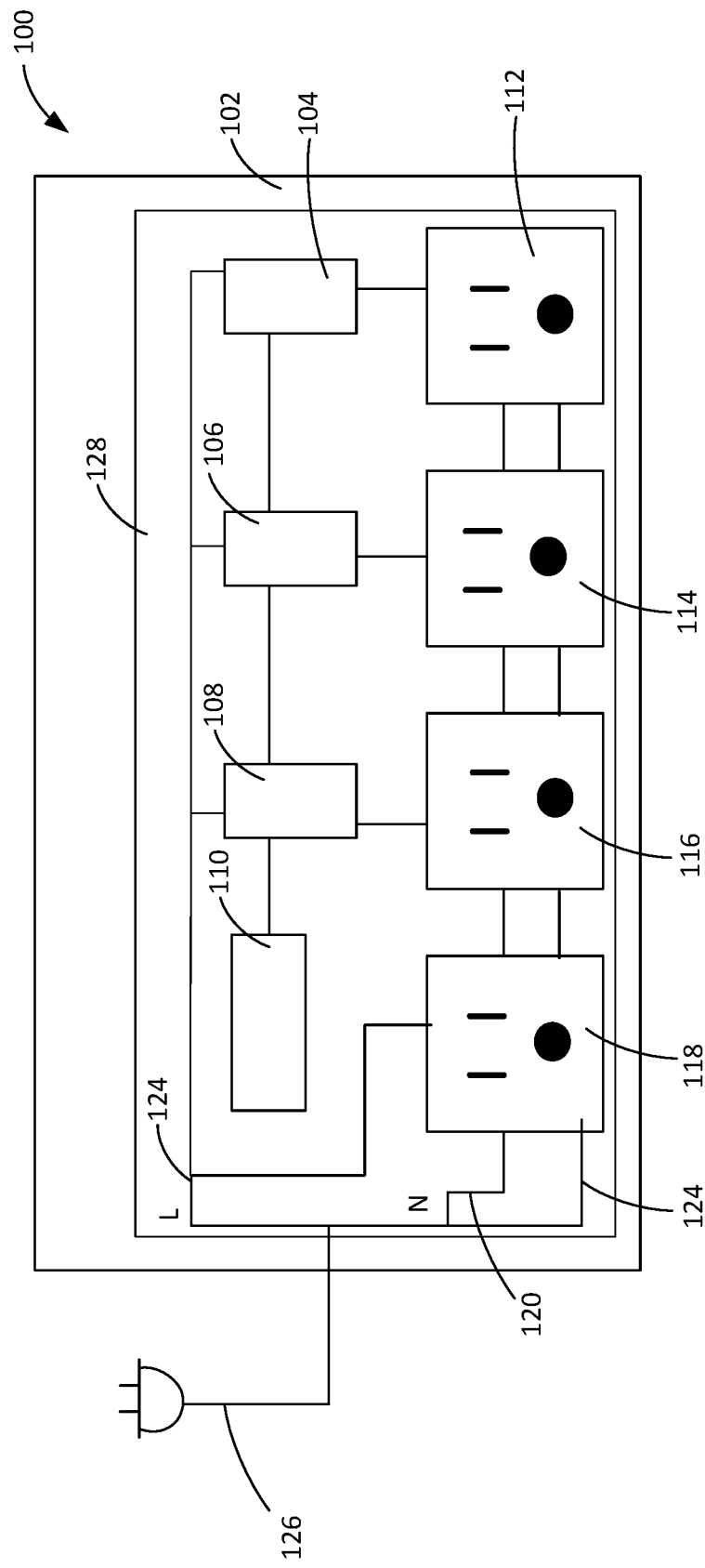
FIG. 1 is a pictorial representation of a load presence controlled power strip in accordance with an aspect of the present disclosure.
Figure 2A:
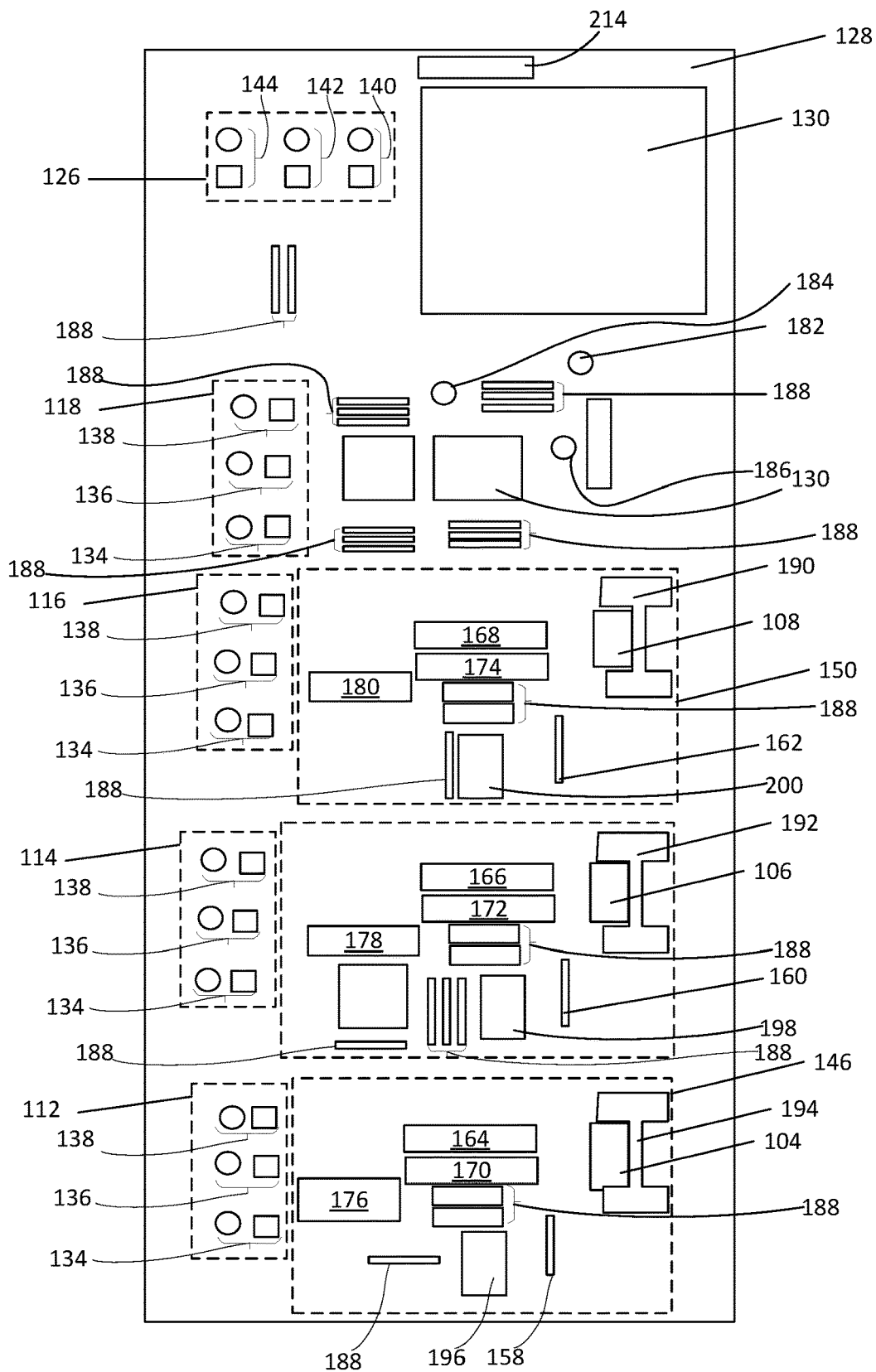
FIG. 2A-B are pictorial representations of a circuit for a load presence controlled power strip in accordance with an exemplary aspect of the present disclosure.
Figure 2B:
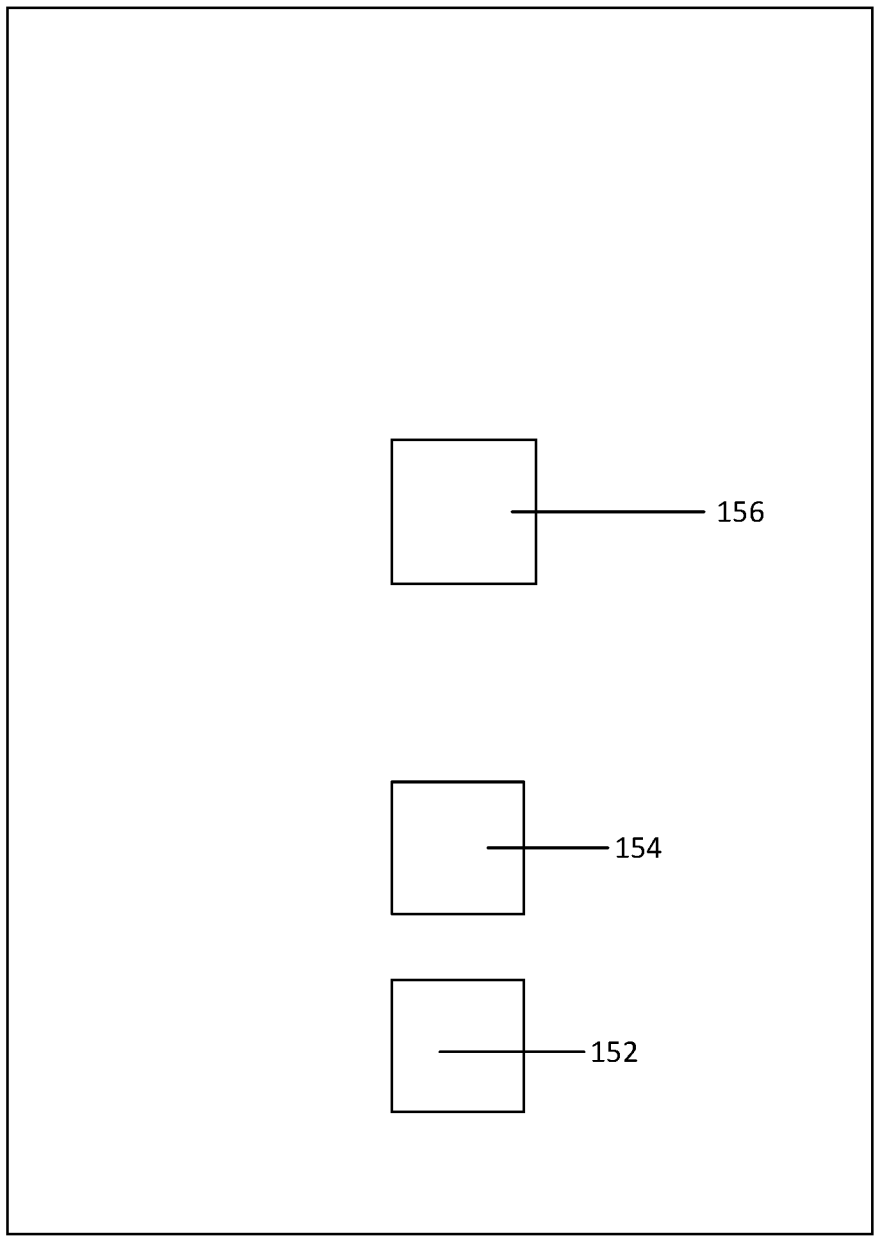

Some of the figures include graphical and ornamental elements. It is to be understood the illustrative aspects contemplate all permutations and combinations of the various graphical elements set forth in the figures thereof.

DETAILED DESCRIPTION

The following discussion is presented to enable a person skilled in the art to make and use the present teachings.

Various modifications to the illustrated aspects will be clear to those skilled in the art, and the generic principles herein may be applied to other aspects and applications without departing from the present teachings. Thus, the present teachings are not intended to be limited to aspects shown but are to be accorded the widest scope consistent with the principles and features disclosed herein. The following detailed description is to be read with reference to the figures, in which like elements in different figures have like reference numerals. The figures, which are not necessarily to scale, depict selected aspects and are not intended to limit the scope of the present teachings. Skilled artisans will recognize the examples provided herein have many useful alternatives and fall within the scope of the present teachings. While aspects of the present disclosure are discussed in terms of current limiting components, it is fully contemplated that aspects of the present disclosure could be used in most any electrical current management application without departing from the spirit of the disclosure.

The present disclosure details a load presence controlled power strip configured to instantaneously, nearly instantaneously or gradually ramp up (i.e., soft start) the current to one or more electrical outlets of a power strip. The outlets of the power strip can be controlled individually, separately, or cooperatively. The outlets of the power strip can be of the same or different amperage and/or voltage. The incoming power connection can be an electrical terminal block for making a hardwire connection to a power a source or a power receptacle for making a pluggable connection to a power source. One, or more, or all of the outlets may be on the same or separate control circuits, such as on the same or separate circuit breaker. Current demand at one or multiple of the outlets may be used to control current to one, multiple or each of the other outlets of the power strip.

By their vary nature, power strips are meant to allow for the powering of multiple electrical outlets in a single enclosure drawings power from a single electrical supply. Overloading the electrical outlet providing power to the power strip happens frequently, especially when one or more medium to high current devices are plugged into the strip and operated. A new construction site is a good example. Electricians often only wire one outlet at a new construction site, which is often at an electrical box a distance from the construction site. For example, the electrical box may be configured to provide 20 amp (single phase) electrical service, or other amperages and phases of electrical service. Extension cords are often run from the electrical outlet to an electrical power strip closer to a work area for powering construction tools and operations. Operation of the construction tools can result in too great of load on the electrical outlet power supply, which trips a breaker at the electrical outlet or electrical box. Loss of power during construction halts progress and requires someone to journey to the electrical outlet, often at the electrical box, to reset the breaker to resume construction and operations. Unwanted breaker tripping is particularly frustrating and halts all progress when construction is ongoing into the late evening hours or early morning hours when natural light is limited or nonexistent. Moreover, being limited to a single voltage and/or amperage outlet on a power strip can limit usage of the power strip for tasks and operations that require different amperage and/or voltage. A power strip that manages electrical current to one, multiple or each electrical outlet, of the same or differing amperage and/or voltage, of a power strip can provide electrical power to multiple construction tools and prevent the breaker at the outlet or electrical box from tripping during use allowing construction or other operations to progress without power lose interruptions.

In a preferred aspect, power electronics are used to cool a resistance. A programmable controller/Triac (triode for alternating current) or SCR (silicon-controlled rectifier) circuit, over the course of a couple hundred milliseconds (i.e., on/off) or a few seconds (i.e., soft start), can adjust the amount of current that is supplied to one, multiple, or each outlet of the power strip. In another aspect, power electronics, such as a fan, is used to cool one or more electrical components of the electrical/controlled power strip. In yet another aspect, a bypass relay may be used to control power to and cooling.

In another aspect, a varying resistance (thermistor) can be placed in series between the electrical outlet of a power strip and the incoming electricity supply. The current will be lowered upon initial powering up an electrical device plugged into one or more of the outlets in the power strip due to the resistance of the variable resistance thermistor. As the thermistor heats up the variable resistance drops to near zero due to heating from the introduction of electrical current and thus all available current is being drawn from an electrical outlet in the power strip.

Figure 4A:
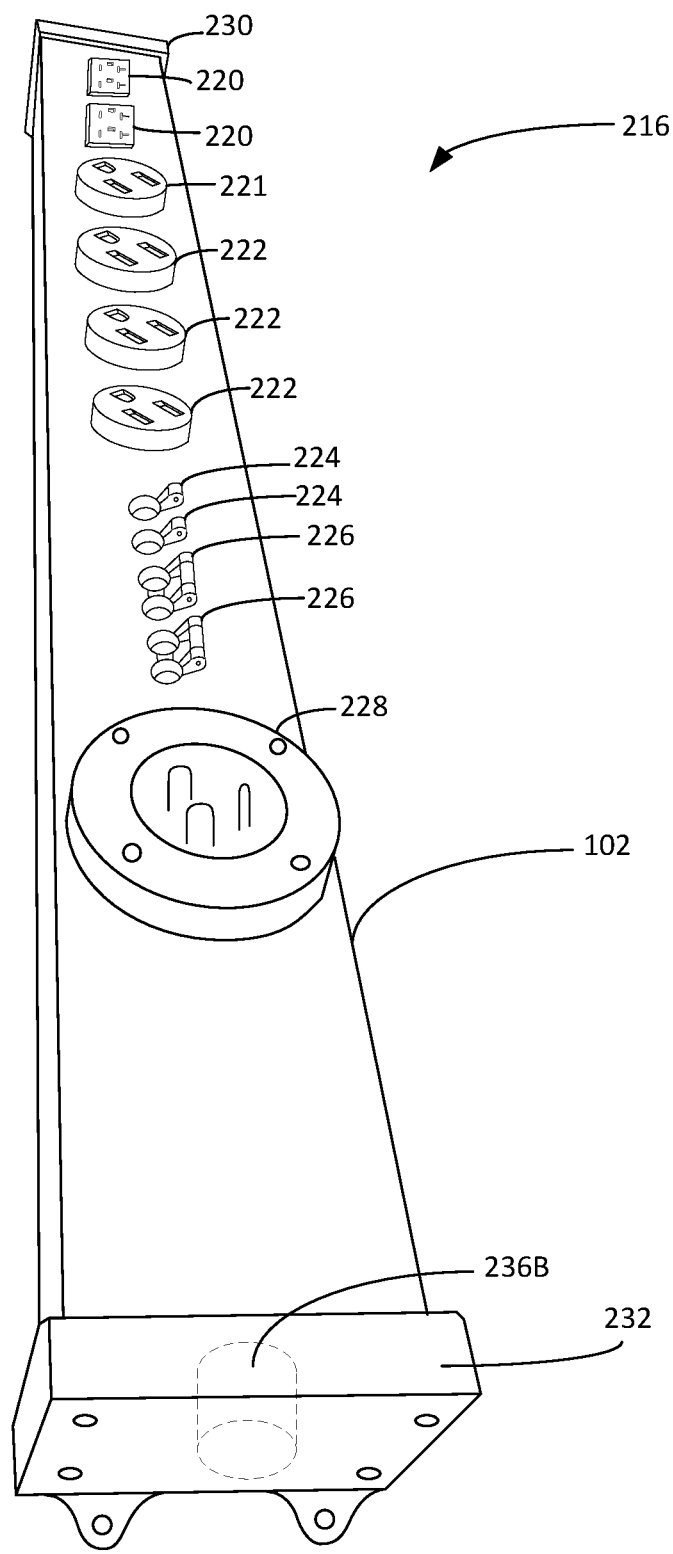
FIG. 4A is a pictorial representation of an electrical power strip in accordance with an exemplary aspect of the present disclosure.
Figure 4B:
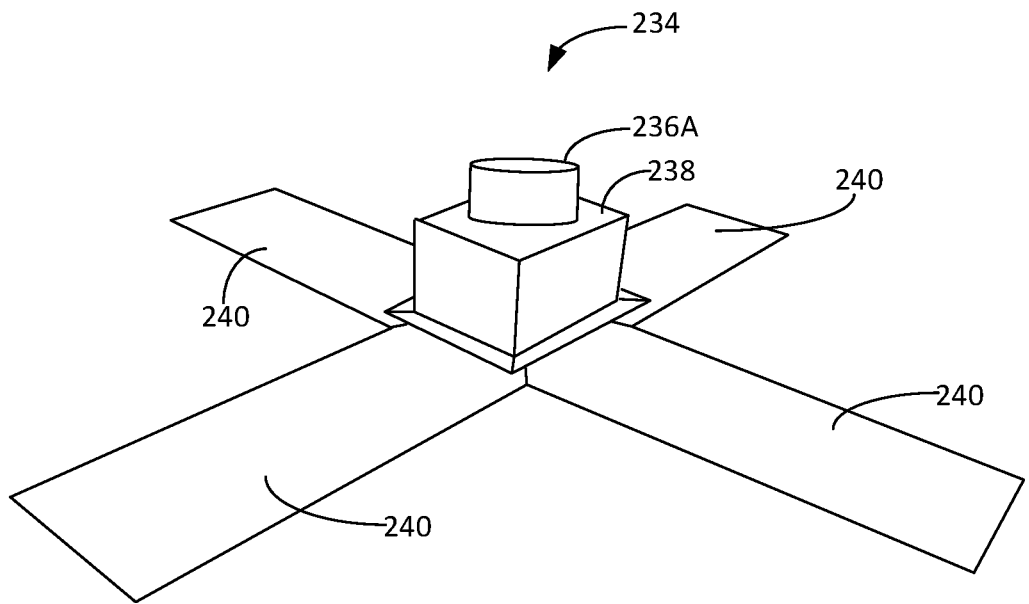
FIG. 4B is a pictorial representation of a stand for an electrical power strip in accordance with an exemplary aspect of the present disclosure.
Figure 4C:
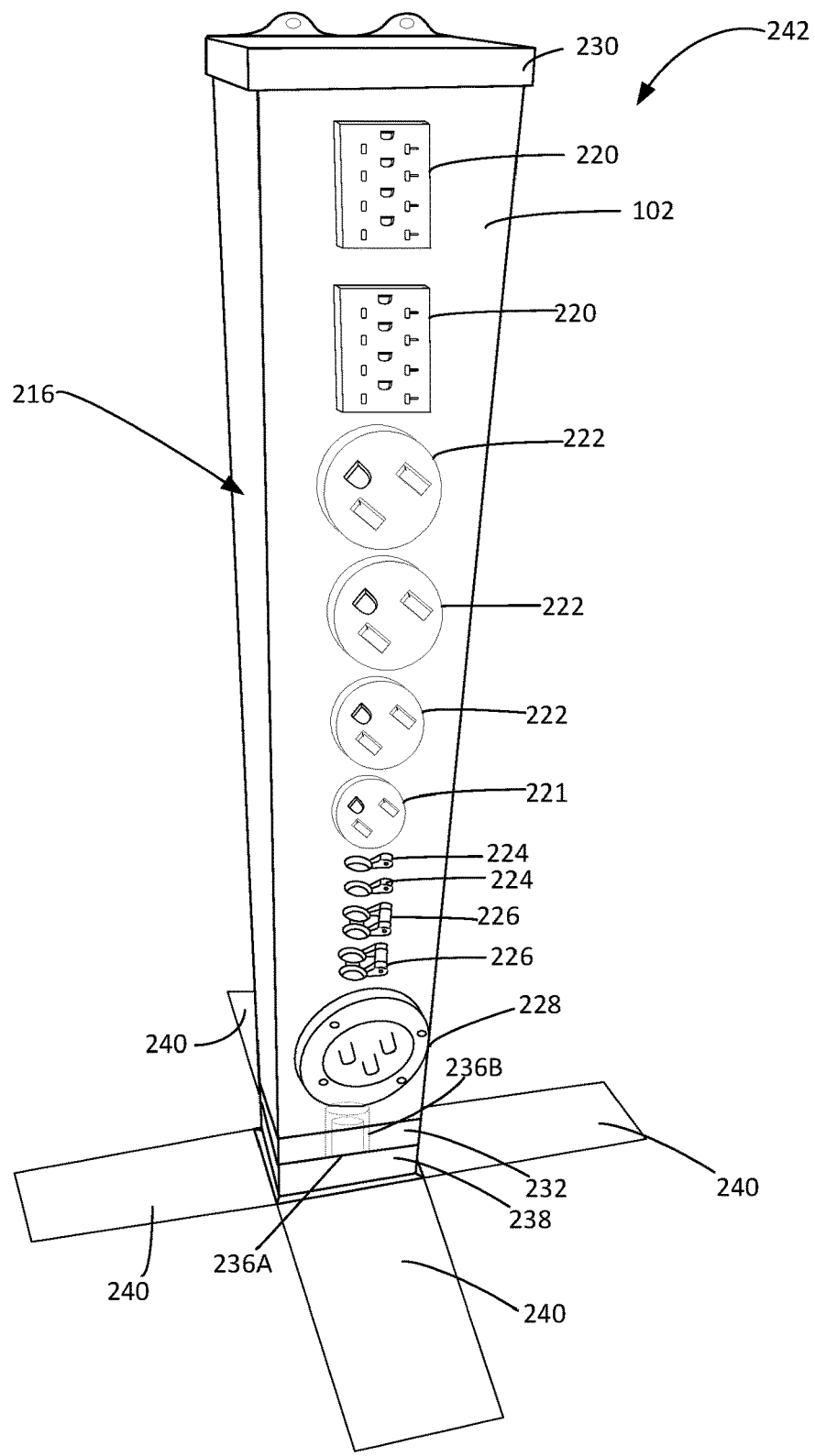
FIG. 4C is a pictorial representation of an electrical power strip and stand configuration in accordance with an exemplary aspect of the present disclosure.
Figure 5A:
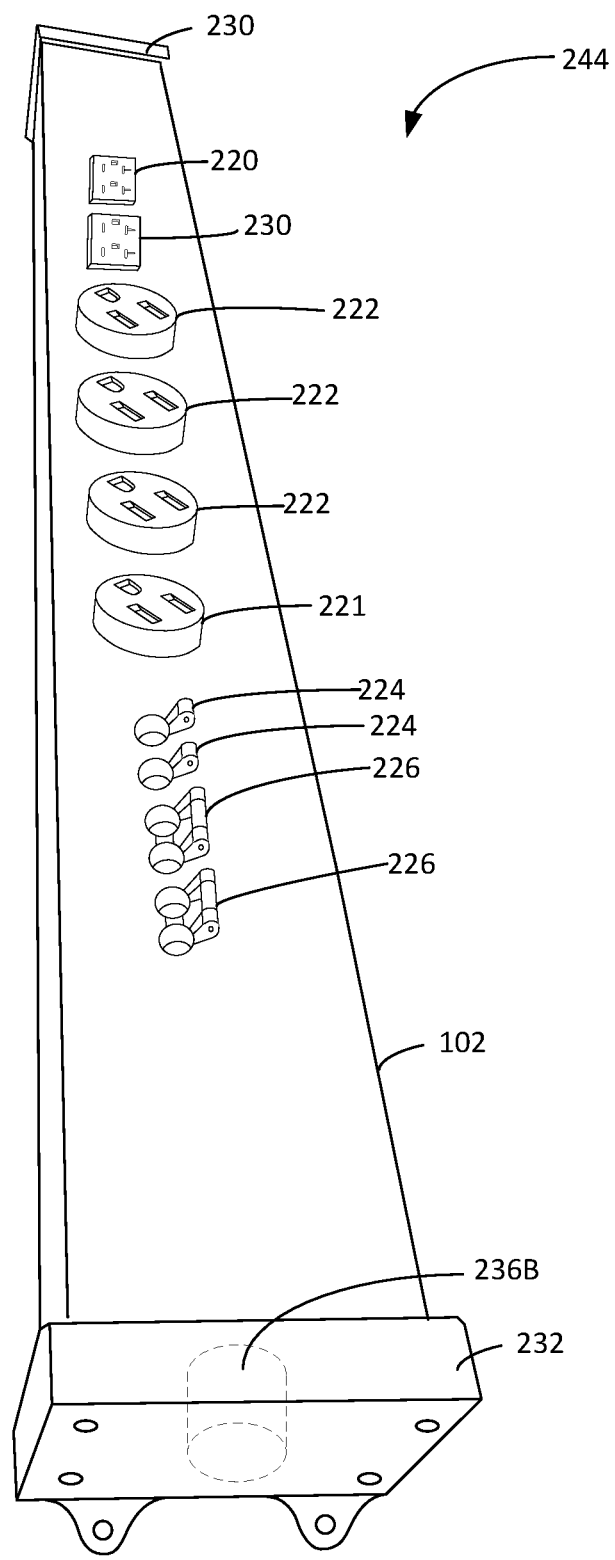
FIG. 5A is a pictorial representation of an electrical power strip in accordance with an exemplary aspect of the present disclosure.

With reference to the figures, a load presence controlled power strip 100 is configured for managing electrical current to one, multiple or each electrical outlet 112-116 is, by way of example, represented pictorially in FIG. 1. The outlets of the power strip can be of the same or different amperage and/or voltage, represented pictorially in FIG. 4A and FIG. 5A. The power strip 100 includes a housing enclosure 102, an electrical input 126 (i.e., power cord), electrical outlets 112-118, Triac SCR assemblies 104-108, a microcontroller 110, a neutral wire 120, a ground wire 122, a hot/live wire 124, and a printed circuit board (PCB) 128. The power strip 216 and 244 can be similarly configured.

Figure 6:
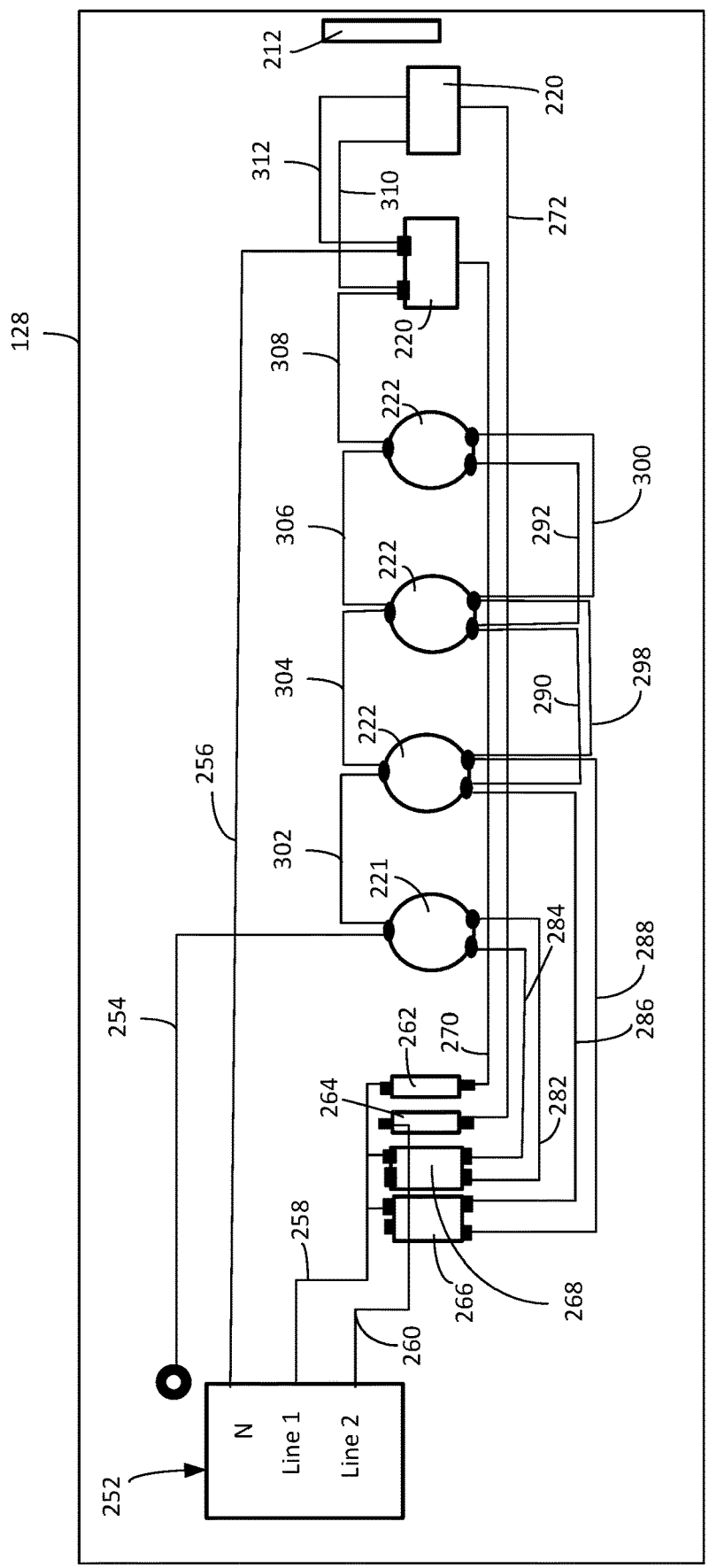
FIG. 6 is a pictorial representation of a circuit for an electrical power strip in accordance with an exemplary aspect of the present disclosure.
Figure 7A:
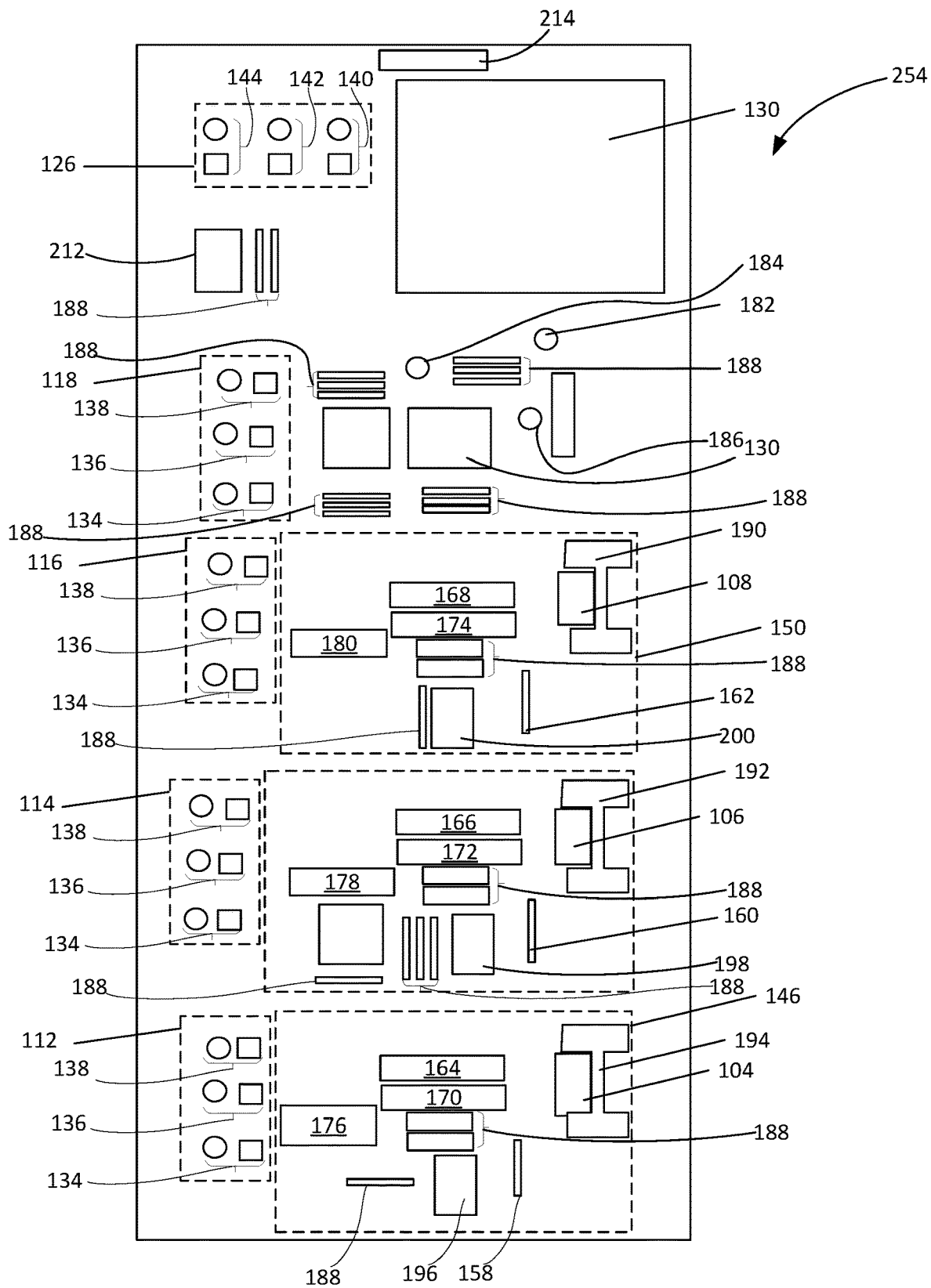
FIGS. 7A-7B are pictorial representations of a circuit for a load presence controlled power strip in accordance with an exemplary aspect of the present disclosure.
Figure 7B:
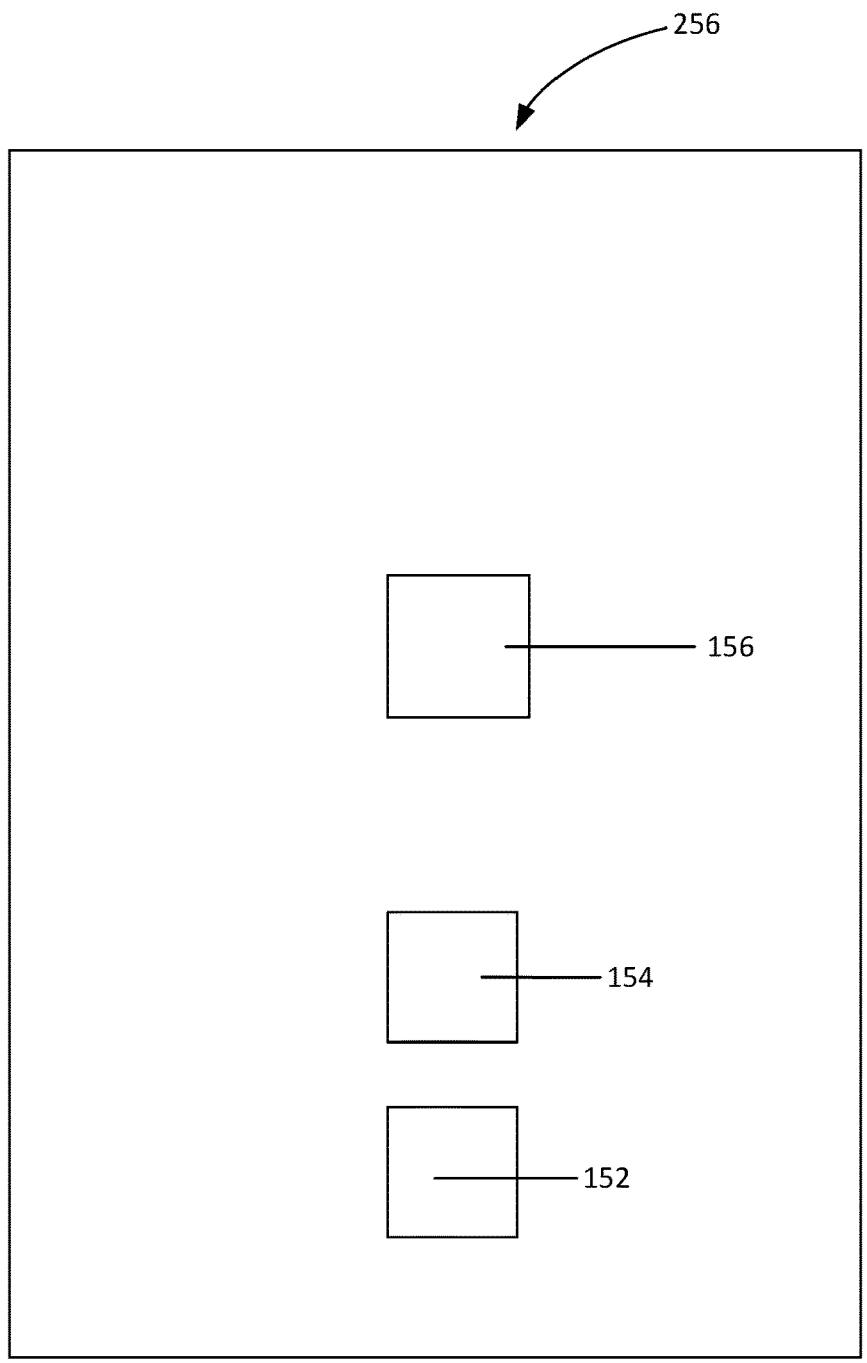

With reference to FIGS. 2A-2B, 7A-7B, and 8A-8B, exemplary pictorial representations of the printed circuit board 128 are illustrated. The circuit board (i.e., PCB) 128 can be configured within the housing enclosure 102 of the power strip 100, 216, 244. The circuit board 128 includes a neutral terminal 140, a ground terminal 142, and a hot terminal 144 or multiple terminal poles 144A-144B. The electrical input 126 (i.e., power cord or hardwire connection) is connected to terminals 140-144 or 144A-144B for powering the circuit board 128. The circuit board 128 also includes a hot terminal 134 or hot poles 134A-134B, a ground terminal 136, and a neutral terminal 138 connected to each electrical outlet 112-118 or 220-222. Connected electrically in-between electrical input 126 and one, multiple or each electrical outlet 112-118 or 220-222 is a current limiting circuit 146-150. Each current limiting circuit 146-150 can include a current sensor 152-156, such as a hall effect current sensor, a zero-crossing detector 158-162 that can include, for example, a diode bridge rectifier 164-168 and an opto-coupler 170-174, Triacs or SCR assemblies 104-108, a circuit breaker 176-180 or 262-268, capacitors 182-186, resistors 188, a heat sink 190-194, an opto-isolator 196-200, and other electronic components. The circuit board 128 also includes a microcontroller 110 for controlling each current limiting circuit 146-150. The circuit board 128 can also include a transformer 130 for powering the low voltage electronics of the circuit board 128. In one aspect, the transformer 130 can be 10:1 transformer for reducing 120V to 12V output for powering electronics on the circuit board 128. The circuit board 128 can also include circuitry for handling different amperages and/or voltages, such as the circuit shown in FIG. 6.

In operation, current sensor 152-156 detects electric current in electrical input 126 and generates a signal proportional to the current. The generated signal could be analog voltage or current or even a digital output. Zero-crossing detector 158-162 is a voltage comparator, used to detect a sine waveform transition from positive and negative, coinciding when the incoming voltage crosses the zero-voltage: condition.

The Triac SCR assembly 104-108 reduce current in current-limiting circuit 146-150. Microcontroller 110 controls the Triac (triode for alternating current) SCR (silicon-controlled rectifier) circuit 104-108, over the course of microseconds or seconds and can adjust the amount of current supplied to electrical outlet 112-116 or 220-222. In one manner of operation, the microcontroller 110 is programmed with software to control the Triac 104-108 to adjust the amount of current instantaneously, nearly instantaneously (e.g., ~200 milliseconds, or just enough to eliminate ~150 milliseconds of inrush current spike), or gradually (e.g., ~few seconds).

Also, during operation, the microcontroller 110 receives a sensed current input from current sensor 152-156. Further, zero-crossing detector 158-162 sends a signal to the microcontroller 110 notifying the microcontroller 110 which phase, positive or negative the incoming alternating current is currently in. Based upon the current sensed at current sensor 152-156, microcontroller 110 controls the firing angle (portion of sine wave allowed to be passed through Triac 104-108) of the Triac 104-108, reducing it to zero degrees (full power) over a few seconds. For example, according to at least one aspect, using the reference from a zero-crossing circuit, the microcontroller 110 will pulse the gate of Triac 104-108 when it is to allow the current to pass. The microcontroller 110 pulses according to the firing angle (or portion of sine wave conducted) that is written in software code loaded onto and operating on the microcontroller 110.

Figure 3:
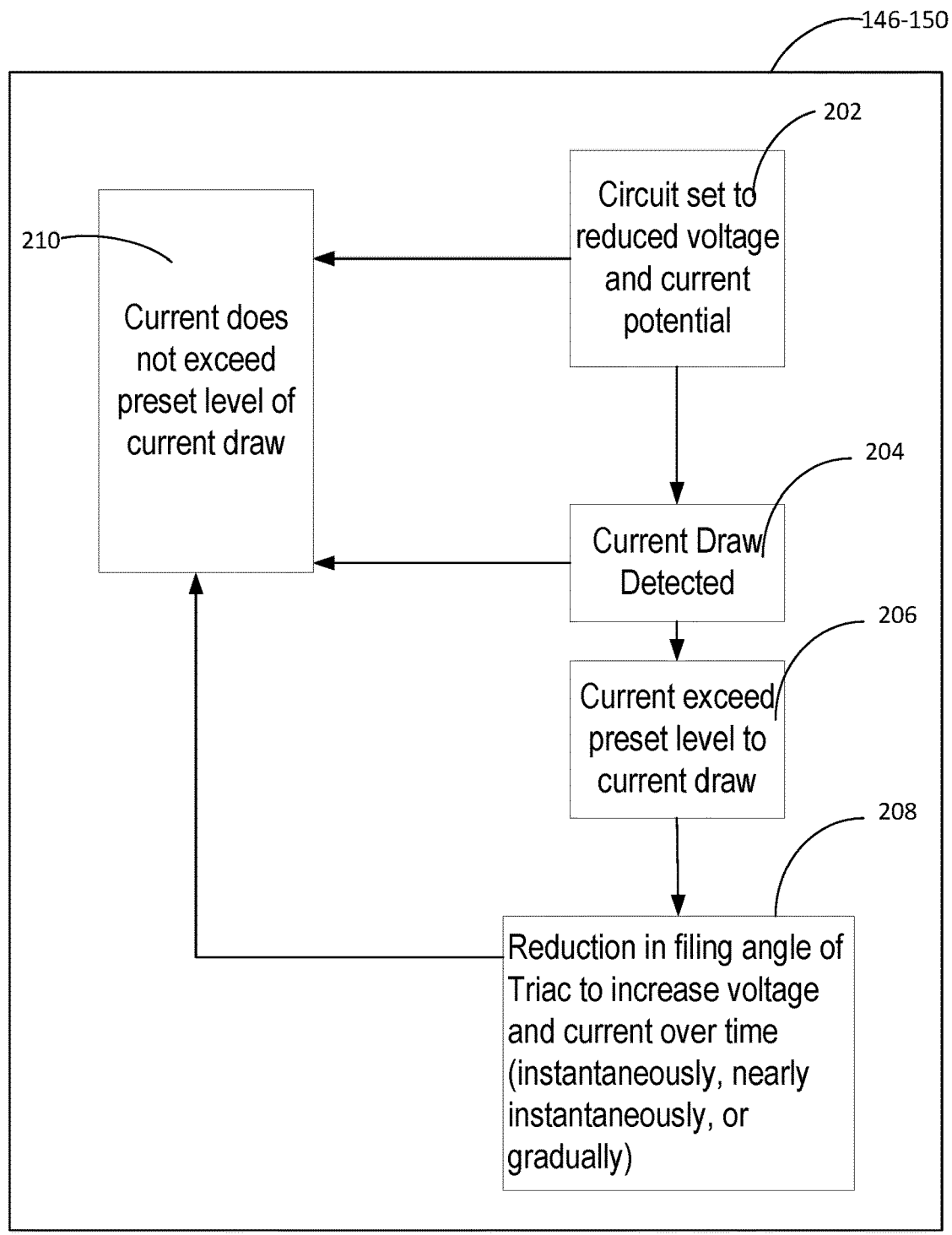
FIG. 3 is a flowchart diagram for a load presence controlled power strip in accordance with an exemplary aspect of the present disclosure.

In at least on aspect, the soft starter sine wave software code will first apply a higher firing angle (which limits output voltage and therefore current) as shown in Step 202 of FIG. 3. If the current detected does not exceed a preset or predetermined current level as shown in Step 210 of FIG. 3 the software loaded on microcontrollers 110 maintains a higher firing angle for Triacs 104-108 so circuit 146-150 is set to reduced voltage and current potential (Step 202). Once a small predetermined current level is exceeded (Step 206), which is sensed by the current sensor 152-156 as discussed in Step 204 of FIG. 3, the software program will instantaneously, nearly instantaneously (e.g., ~200 milliseconds, or just enough to eliminate ~150 milliseconds of inrush current spike), or gradually (e.g., ~over the course of a few seconds; i.e., soft start) reduce the firing angle to zero degrees (Step 208), allowing full power from the Triac 104-108. In at least one configuration, software code operating microcontroller 110 can be programmed so a higher firing angle=lesser portion of sine wave (lower voltage), lower firing angle=greater portion of sine wave (more voltage), and zero degrees firing angle=full sine wave (full voltage/current). When the current returns to a level that does not exceed a preset or predetermined current level (Step 210), such as when a device plugged into outlet 112-116 is turned off, the software code operating microcontroller 110 sets the Triac to a relatively high degree firing angle so circuit is set to reduced voltage and current potential (Step 202).

Triac (triode for alternating current) 104-108 in each current limiting circuit 146-150 is a three terminal electronic component conducting current in either direction when triggered. Also referred to as a bidirectional triode thyristor or bilateral triode thyristor. A thyristor is analogous to a relay. A small voltage of induced current can control a much larger voltage and current. TRIACs are a subset of thyristors and are related to silicon-controlled rectifiers (SCRs). TRIACs differ from SCRs in they allow current flow in both directions, whereas an SCR can only conduct current in a single direction. Most TRIACs can be triggered by applying: either a positive or negative voltage to the gate (an SCR requires a positive voltage). Once triggered, SCRs and TRIACs continue to conduct, even if the gate current ceases, until the main current drops below a certain level called the holding current. The bidirectionality of each Triac makes them convenient switches for alternating-current (AC). In addition, applying a trigger at a controlled phase angle of the AC in the main circuit allows control of the average current flowing into a load (phase control).

Figure 8A:
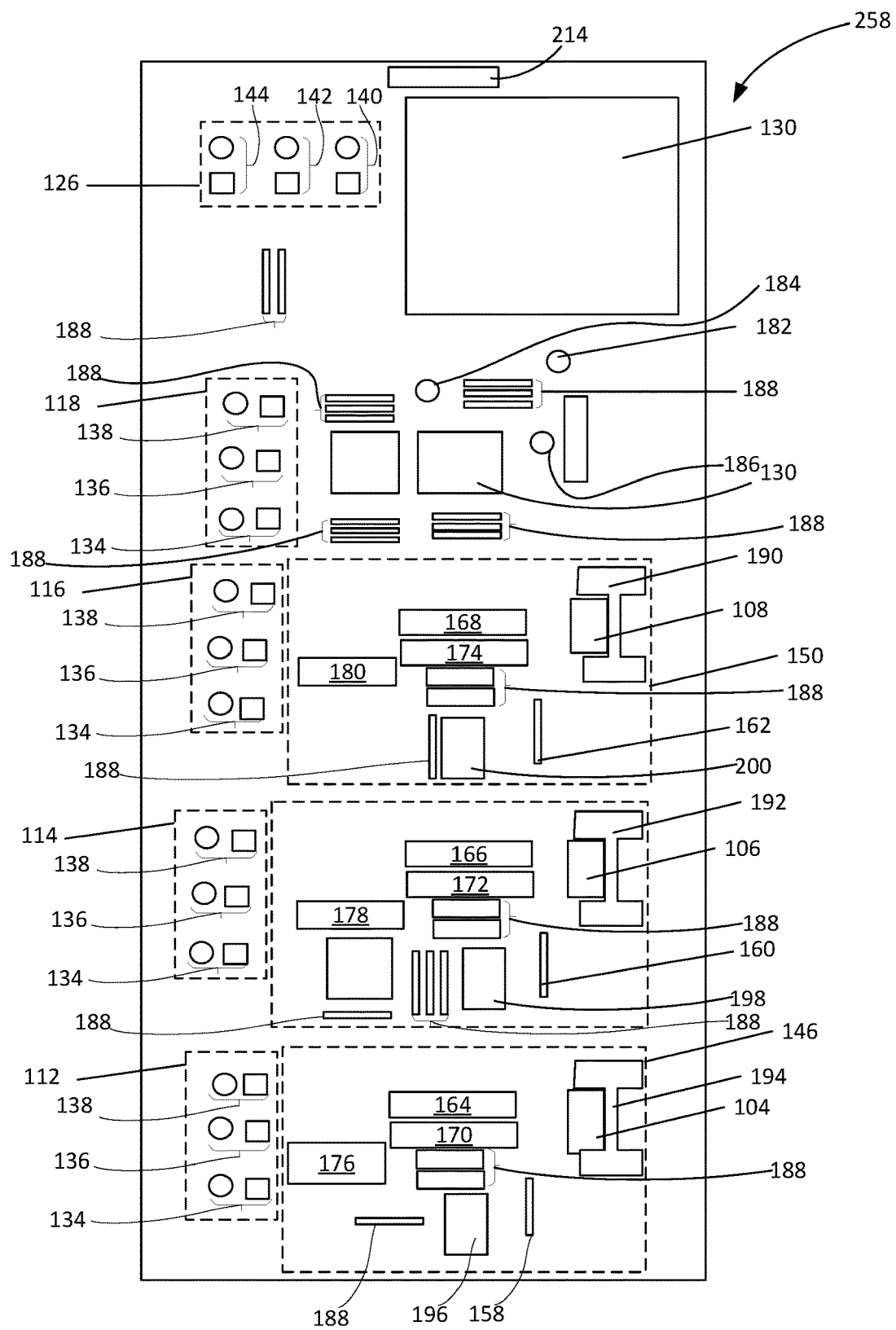
FIGS. 8A-8B are pictorial representations of a circuit for a load presence controlled power strip in accordance with an exemplary aspect of the present disclosure.
Figure 8B:
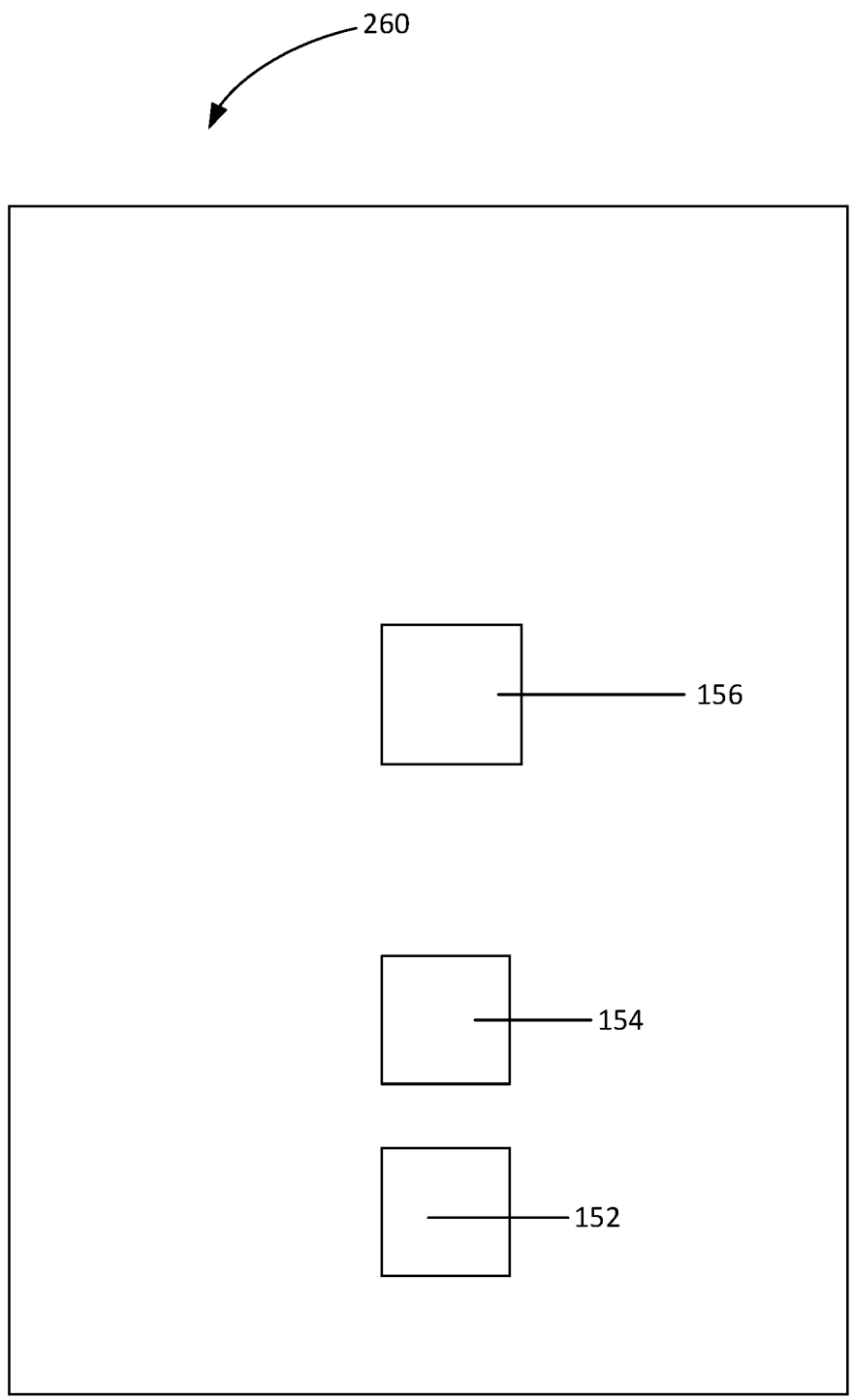

During operation, transformer 130 reduces the voltage for powering the software code operating microcontroller 110 with, for example, 12V instead of 120V. Each current limiting circuit 146-150 can include one or more heat sinks 190-194 for dissipating heat from the Triacs 104-106 and other circuitry components. Other heat dissipators can include, but are not limited to, a fan 212 (FIGS. 7A-7B) or a bypass relay 214 (FIGS. 8A-8B). In at least one example, the use of an axial cooling fan located at the very end of the inside of enclosure 102 (e.g., for power strip 100, 216, 244) is provided. For example, the housing/enclosure 102 may be configured with slotted endcaps 230-232 to allow air circulation in and out of housing/enclosure 102. The fan 212 would be activated by the ON state of any of the controlled outlets. A bypass relay 214 may also be used, such as, for example, for each controlled output. The bypass relay 214 may be configured to activate a couple of seconds after the corresponding output is switched on. The circuit includes one or more circuit breakers 176-180; 224-226, such as 25A circuit breaker for a 20A circuit, 50A two pole for a 50A circuit, 30A two pole for a 30A circuit, 20A single pole for a 20A circuit, or other suitable circuits and circuit breakers, to maintain, for example, a safety rating of 115% of the amperage rating for a device plugged into electrical outlet 112-116; 220-222. Other amperage circuit breakers can be used based on the rating of power strip 100. Opto-isolator(s) 196-200 isolate, for example, using light, the Triac 104-108 input from other circuitry components of each current limiting circuit 146-150.

Power or electrical outlet 112-116; 220-222 can each have a dedicated current limiting circuit 146-150. This allows the power strip to self-configure for a multitude of uses, depending on the devices plugged into electrical outlets 112-116; 220-222. In one aspect, current can be limited in one outlet 112-116; 220-222 and not limited in another outlet 112-116; 220-222 using current limiting circuits 146-150 and software-controlled microcontroller 110. One outlet 112-116; 220-222 can be turned on while the other outlets 112-116; 220-222 can be turned off at the same time. In a preferred aspect, current limiting circuits 146-150 are controlled by microcontroller 110 to only allow one of outlets 112-116; 220-222 to receive current at any one time to prevent overloading and tripping of the electrical power (e.g., source, outlet, breaker box, electrical box) providing power to the power strip (e.g., 100, 216, 244). According to this aspect of the disclosure, once one outlet 112-116; 220-222 is no longer in use and a load is sensed at a different outlet 112-116; 220-222, current limiting circuits 146-150 will keep the other outlets 112-116; 220-222 off and turn on the different outlet 112-116; 220-222 where the load is sensed. In another preferred aspect, power strip includes at least one outlet, such as, for example, in at least one aspect, outlet 118 or one of outlets 220-222, that is always powered on independent of outlets 112-116; 220-222 being on or off. In another aspect, at least one outlet may be configured for low power devices, such as a radio, light, or small electronic device charger. In at least one other aspect, at least one outlet may be configured for high voltage and/or amperage devices.

In operation, for example, the electrical input (i.e., power cord or electrical wire in the case of the incoming power connection being hardwired) 126 is plugged into a power outlet to manage the load placed on the power outlet by managing the current flowing to each outlet 112-116; 220-222 of the power strip using current limiting circuits 146-150. By way of example, without limiting the scope and application of the disclosure, the power strip usage at a new construction site is illustrated to aid in understanding the many benefits of a single or multiple phase soft starter power strip. Electricians often only wire one outlet at a new construction site, which is often at an electrical box a distance from the construction site. Extension cords are often run from the electrical outlet to an electrical power strip closer to a work area for powering construction tools. Operation of the construction tools can result in too great of load on the electrical outlet, which trips a breaker at the electrical outlet or electrical box. Loss of power during construction halts progress and requires someone to journey to the electrical outlet, often at the electrical box, to reset the breaker to resume construction. Unwanted breaker tripping is particularly frustrating and halts all progress when construction is ongoing into the late evening hours or early morning hours when natural light is limited or nonexistent. A single or multiple-phase soft starter power strip is configured to manage electrical current to one, multiple or each electrical outlet 112-116; 220-222 of power strip (e.g., 100, 214, 244) to provide electrical power with the same or different amperage and/or voltage to multiple construction tools and prevent the breaker at the outlet or electrical box from tripping during use allowing construction to progress without power lose interruptions. This is accomplished as current limiting circuits 146-150 manage current to outlet 112-116; 220-222 during use of the power strip. In one aspect, electric powered devices are plugged into each outlet 112-118. In one configuration, electric power device plugged into outlet 118 of power strip 100 is permitted to have continuous current and power (i.e., outlet 118 is always on). In one aspect, current to outlets 112-116; 220-222 is managed using current limiting circuits 146-150 such that power to electric powered devices plugged into outlets 112-116; 220-222 is permitted to only one outlet at time. In this manner, for example, referring to power strip 100, if outlet 112 is in use, outlets 114, 116 will have no power. When outlet 112 is no longer in use, the current limiting circuits 146-150 will power the next outlet 114-116 to sense a load from the electric powered devices plugged into outlets 114-116. The same configuration and operation can apply to outlets 220-222. Using power strip 100 as an example, while understanding that power strips 214, 244 can operate using the following principles, operations, and configurations, the following examples are provided. Thus, for example, on a construction site, an air electric compressor is plugged into outlet 112, an electric saw is plugged into outlet 114, an electric drill is plugged into outlet 116, and a battery charger is plugged into outlet 118. The batter charger receives continuous power from outlet 118; however, the electric air compressor, electric saw, and electric drill will not be permitted by the current limiting circuits 148-150 to operate simultaneously to control the load placed on the outlet supplying power to the power strip 100. If, for example, outlet 112 is providing power to the electric air compressor so it can operate, outlets 114-116 will not receive power for operating the electric saw plugged into outlet 114 and the electric drill plugged into outlet 116. When the electric air compressor turns off and not current is sensed, outlet 112 will turn off and the current sensor 152-156 will sense current and turn on outlet 114 or outlet 116 depending upon in which outlet current is sensed.

The configurations of the present disclosure offer significant safety features and functionality to keep users safe from shock and electrocution, while also protecting electrical power consuming devices from being harmed. For example, the current limiting circuits 146-150 are set to reduced voltage and current potential and any immediate current draw is very limited, thus resulting in very little chance for shock more than a tingle and/or electrocution. In another example, if during reduction of the firing angle of the Triac 104-108 thus resulting in increased voltage and current over time, if an outlet/output wire of the circuit were accidentally cut it would trip circuit breaker(s) 176-180; 224-226.

Figure 5B:
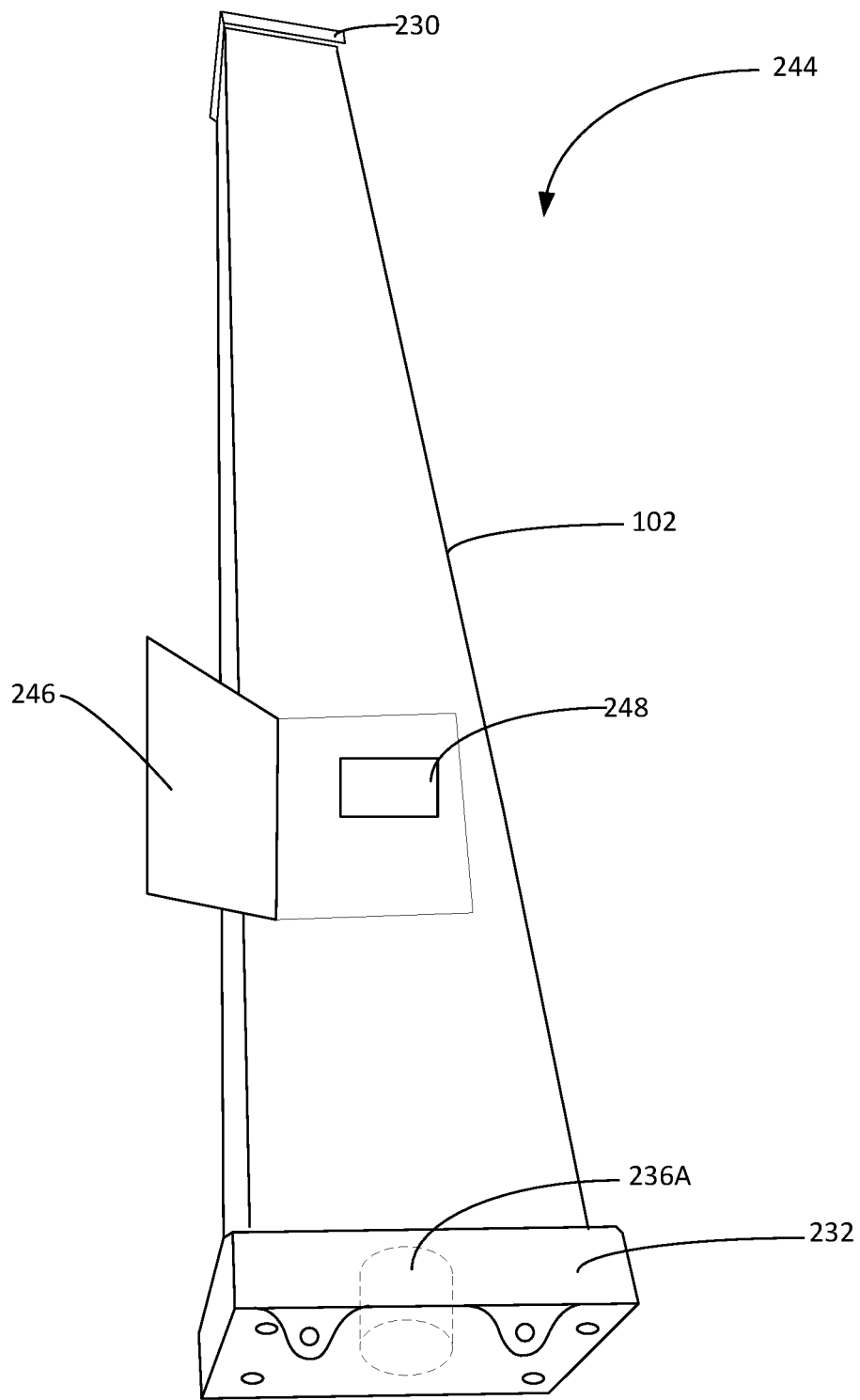
FIG. 5B is another pictorial representation of an electrical power strip in accordance with an exemplary aspect of the present disclosure.
Figure 5C:
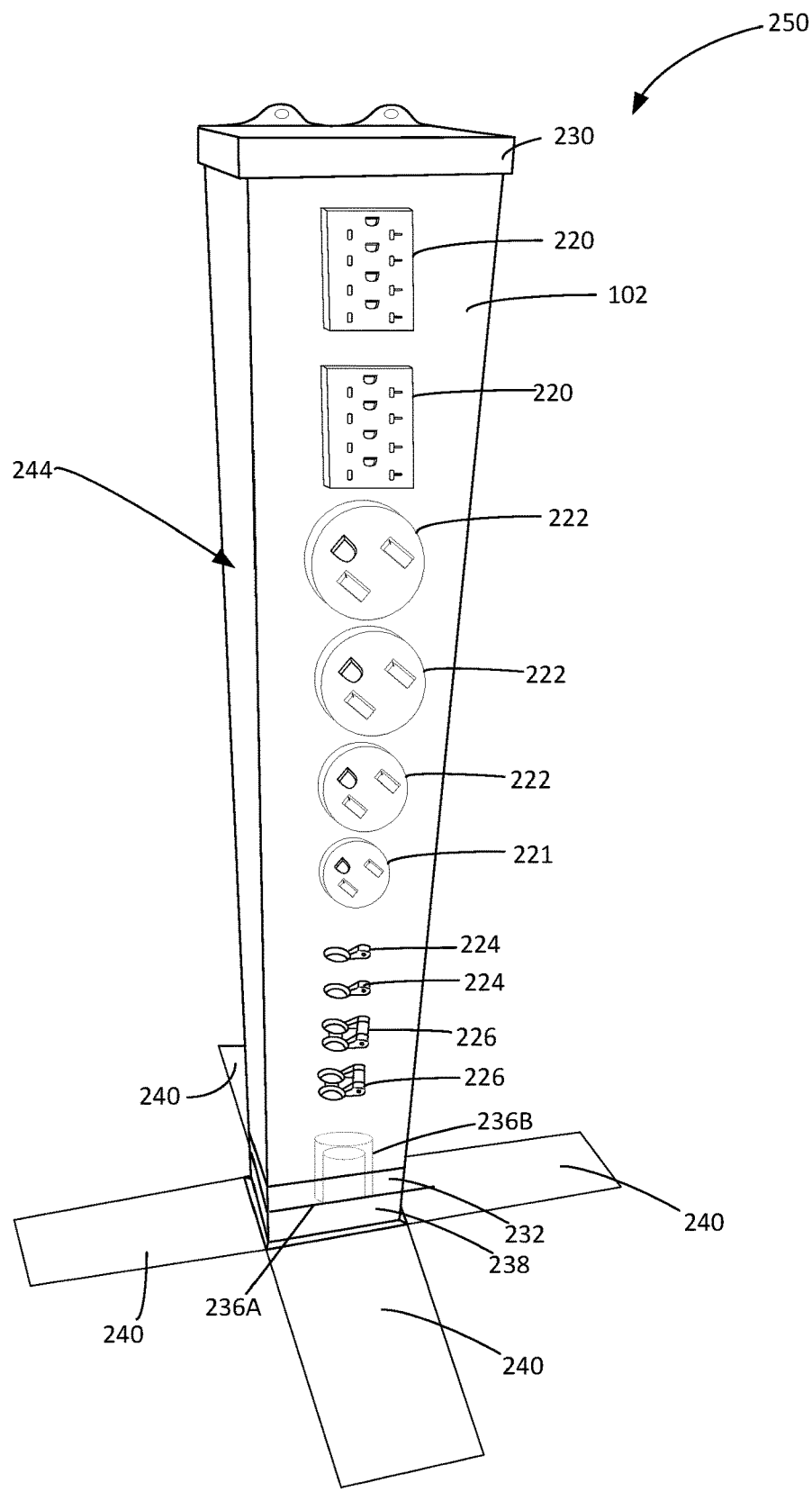
FIG. 5C is a pictorial representation of an electrical power strip and stand configuration in accordance with an exemplary aspect of the present disclosure.

Controlled electronics of the present disclosure can be configured as discussed herein to control and manage the same or different amperage and/or voltage outlets. Power strips 214, 244 provide exemplary aspects for a power strip configured with different amperage and voltage outlets 220-222. The incoming power connection providing power to the power strip can be configured as a receptacle power connection 228 (FIG. 4A) or a hardwired power connection (FIG. 5A), using for example, an electrical terminal block 248, accessible by removing, for example, panel 246 (FIG. 5B). The incoming power connection can be, for example, a 50A, three pole, 4-wire twist lock L14-50R (50A maximum) power receptacle 228. Other power connections are contemplated based on the corresponding amperages and/or voltages of the outlets 220-222. A hardwired power connection, such as a three pole terminal block 248 (e.g., up to 100A), can be configured within housing 102, such as behind a removable panel 246. Other hardwire power connections are contemplated based on the corresponding amperages and/or voltages of outlets 220-222. The incoming power connection, for providing power to the strip, can be operably connected to electrical input 252 on circuit board 128. The electrical input 252 can be configured having a ground line 254, neutral line 256, power line 1 258, power line 2 260, or additional power lines depending upon the configuration of the power strip, the number of outlets 220-222, type of outlets 220-222, amperages for each of outlets 220-222, and voltages for each of outlets 220-222. In one example, power strip 214, 244 may be wired 288, 298, 300, 286, 290, 292, 254, 302, 304, 306, 308, 310, with one or more 50A outlets/receptacles 222, such as 240V, 50A receptacles, including, for example, one or more 50 amp, 240 volt, 6-50R, 2 pole, 3 wire receptacles. In one example, the power strip 214, 244 may also be wired 282, 284, 254, with one or more 30A outlets/receptacles 222, such as 240V, 30A receptacles, including, for example, one or more 30 amp, 240 volt, 6-30R, 2 pole, 3 wire receptacles. In one example, the power strip 214, 244 may also be wired 270, 272, 254, 302, 304, 306, 308, 310, 256, 312 with one or more 20A outlets/receptacles 220, such as 120V, 20A receptacles, including, for example, one or more 20 amp, 120 volt, 5-20R, 1 pole, 3 wire receptacles. Each of the one or more outlets 220-222 can be wired to separate or the same circuit protectors, such as circuit breakers 224-226. In one example, power strip 214, 244 may be configured with one or more 50A outlets/ receptacles 222, such as 240V, 50A receptacles, including, for example, one or more 50 amp, 240 volt, 6-50R, 2 pole, 3 wire receptacles wired 258, 286, 288, 290, 292, 298, 300 to one or more 50A 2 pole circuit breakers 266 and electrical input 252. In one example, the power strip 214, 244 may also be configured with one or more 30A outlets/receptacles 222, such as 240V, 30A receptacles, including, for example, one or more 30 amp, 240 volt, 6-30R, 2 pole, 3 wire receptacles wired 258, 282, 284 to one or more 30A 2 pole circuit breakers 268 and electrical input 252. In one example, the power strip 214, 244 may also be configured with one or more 20A outlets/receptacles 220, such as 120V, 20A receptacles, including, for example, one or more 20 amp, 120 volt, 5-20R, 1 pole, 3 wire receptacles wired 258, 260, 270, 272 to one or more 20A single pole circuit breakers 262, 264 and electrical input 252. The enclosure/housing 102 can include endcaps 230, 232 for mounting the power strip to a surface, such as in a vertical or horizontal position, such as to a surface, preferably a wall, table, bench, ceiling, or other suitable surface. The power strips of the present disclosure can also be configured with one or more mounting endcaps 230, 232 that includes one or more features for removably mounting the housing 102 to a stand 234. In one aspect, housing 102 or one or both of endcaps 230, 232 can include a feature for being removably mated to the stand 234. For example, an end of housing 102 may be configured with a receiver 236B feature, such as a hole, with threaded or slip sidewalls. The receiver 236B feature may be accessible by removing an endcap 230/232. An endcap 230/232 may be configured with receiver 236B feature. A separate set of endcaps having the receiver 236B feature may be provided, in addition to endcaps 230, 232. The stand 234 includes a corresponding mount 236A feature, which is mateably received within receiver 236B of the power strip. The mount 236A feature may, like the receiver 236B feature, have threaded or slip configured sidewalls for mutually and removably mating the two features together. In one aspect, the stand 234 includes a base 238 to which one or more supports 240, such as legs, are attached. A power stand 242 can be configured by attaching the power strip 100, 214, 244 of the present disclosure to stand 234. The stand 234 keeps the power strip upright, easily accessible, and positioned away from potential hazards, such as exposure to water, moisture, or other potentially hazardous substances.

The disclosure is not to be limited to the aspects described herein. In particular, the disclosure contemplates numerous variations in inrush current limiting. The foregoing description has been presented for purposes of illustration and description. It is not intended to be an exhaustive list or limit any of the disclosure to the precise forms disclosed. It is contemplated that other alternatives or exemplary aspects are considered included in the invention. For example, a switch relay, current sensor and microcontroller could be used to switch power on/off to one, multiple or each outlet 112-118. In this case the switch relay would handle inrush current and significantly decrease its useable lifespan. In another example, an insulated-gate bipolar transistor (IGBT), which is a three-terminal power semiconductor, can be used with a series of transistors and accompanying transistor components to switch power on/off to one, multiple or each outlet 112-128. The description is merely examples of aspects, processes, or methods of the invention. It is understood that any other modifications, substitutions, and/or additions can be made, which are within the intended spirit and scope of the invention.

What is claimed is:

1. A method for controlling power to outlets of a load presence controlled power strip, the method comprising:
   providing a power strip with a power cord for connecting to a power outlet and a plurality of electrical outlets connected to receive the electrical current from the power cord;
   powering the power strip with an electrical current from the power outlet;
   configuring a current limiting circuit connected between the power cord and the plurality of electrical outlets;
   controlling a microcontroller connected to the current limiting circuit;
   detecting current draw with a current sensor connected to at least one of the plurality of electrical outlets;
   increasing current over time to one of the plurality of electrical outlets by the configuring of the current limiting circuit by operation of the microcontroller if the current sensor detects electrical current to the one of the plurality of electrical outlets.

2. The method of claim 1, further comprising:
   sending a signal to the microcontroller for turning off a selection of the plurality of electrical outlets depending upon electrical current sensed by the current sensor.

3. The method of claim 1, further comprising:
   controlling current to at least one or more of the plurality of electrical outlets with the current limiting circuit.

4. The method of claim 1, further comprising:
   operating the microcontroller with software code loaded onto the microcontroller for controlling current differently to two or more of the plurality of electrical outlets.

5. The method of claim 1, further comprising:
   powering on one of the plurality of electrical outlets when in use and powering off remaining ones of the plurality of electrical outlets when the one of the plurality of electrical outlets is in use by operation of the current limiting circuit.

6. The method of claim 1, further comprising:
   providing a plurality of the current limiting circuit, wherein each of the plurality of electrical outlets is connected to a separate one of the plurality of the current limiting circuit.

7. The method of claim 1, further comprising:
   providing a plurality of the current limiting circuit and controlling each of the plurality of the current limiting circuit with a controller connected to a current sensor for each the plurality of electrical outlets.

* * * * *